May 26, 1970     D. L. RICHARDS     3,514,087
ATTACHMENT FOR CUTTING TORCHES
Filed Nov. 7, 1967
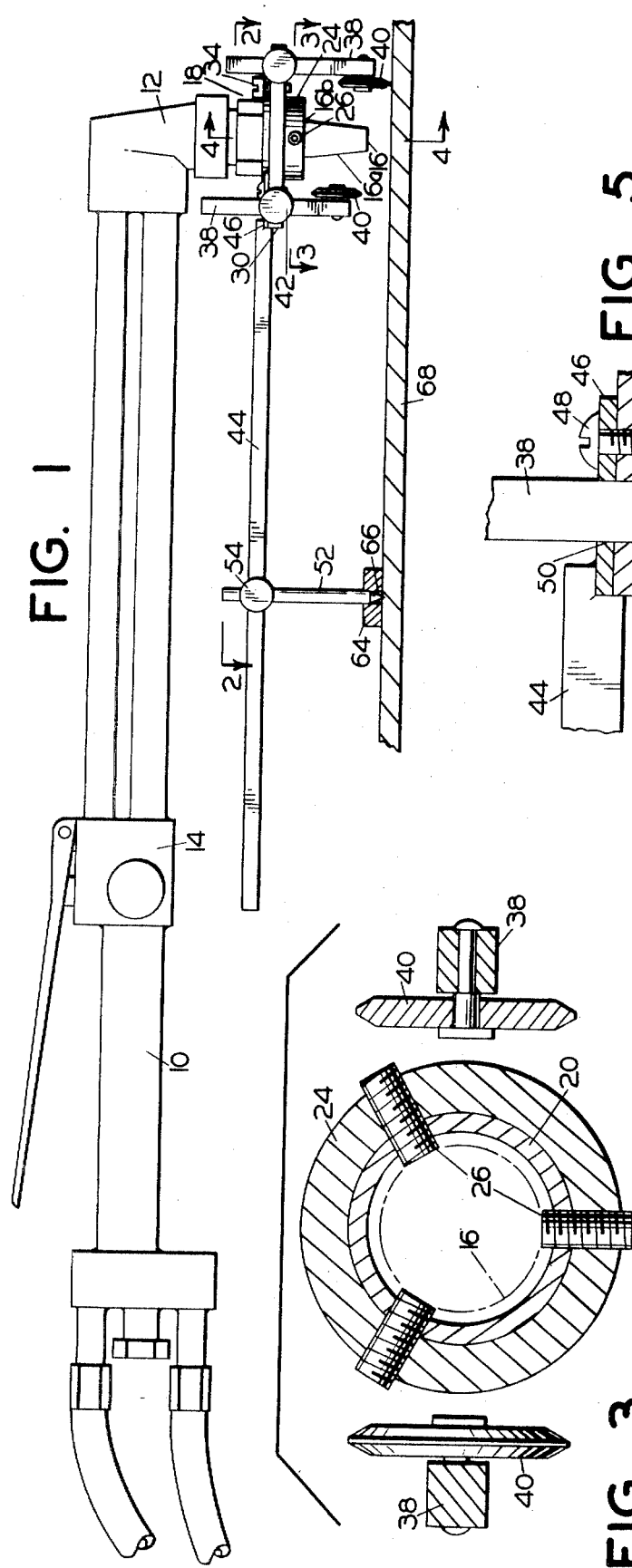
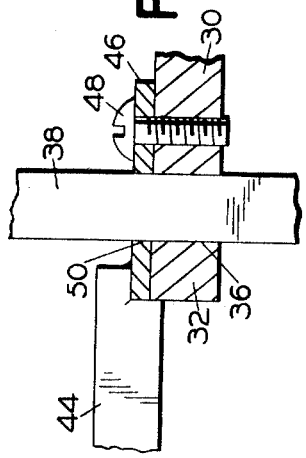
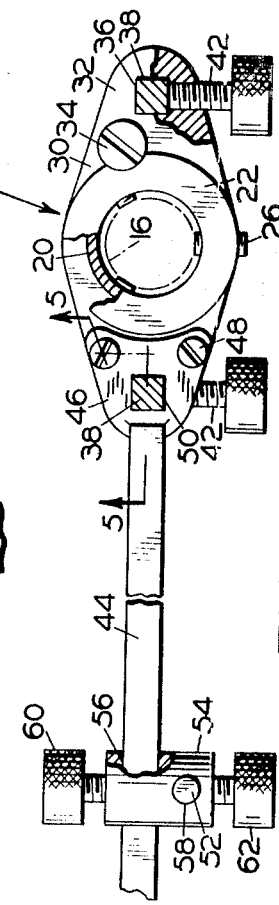
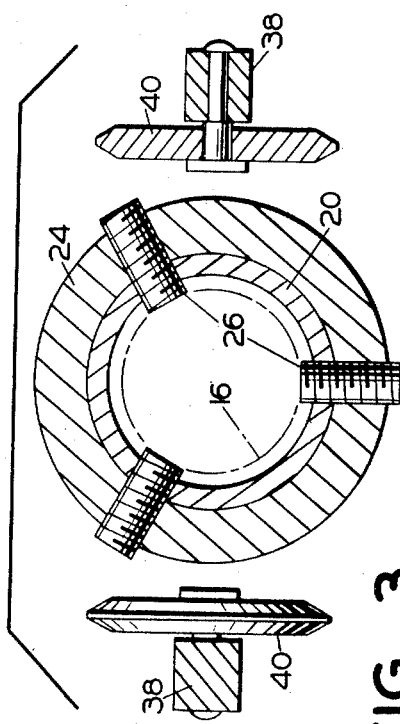
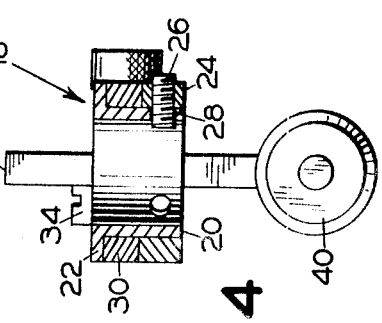
INVENTOR.
DONALD L. RICHARDS
BY Eugene M. Eckelman
ATTORNEY United States Patent Office 3,514,087
Patented May 26, 1970

3,514,087
ATTACHMENT FOR CUTTING TORCHES
Donald L. Richards, 5950 SE. Kelly St.,
Portland, Oreg. 97206
Filed Nov. 7, 1967, Ser. No. 681,448
Int. Cl. B23k 7/10
U.S. Cl. 266—23                          5 Claims

ABSTRACT OF THE DISCLOSURE

The attachment includes an annular body member arranged to be detachably secured on the tip of a cutting torch. This body member has a carrier thereon which supports wheel posts and a pivot post. The wheel supporting posts and pivot post have length adjustment in the carrier, and the carrier has rotatable positioning on the body member. An elongated arm projects laterally from the carrier and supports the pivot post for slidable adjustment.

---

This invention relates to new and useful improvements in attachments for cutting torches and has as its primary objective to provide such an attachment with a novel combination of supporting guide means for moving the torch in a circular motion or in a straight line.

Another object of the invention is to provide an attachment for cutting torches which is an independent integrated unit with relation to the torch and which is readily attachable to and detachable from the tip of a cutting torch.

A more particular object of the invention is to provide an attachment for cutting torches having a pivot post for guiding the torch in a circular path, a pair of supporting wheels in laterally spaced relation arranged for individual or combined use in supporting the torch in straight line or circular paths, and a rotatable adjustable head for supporting the pivot post and the wheel supporting arms in selected positions.

The invention will be better understood and additional objects and advantages will become apparent from the following description taken in connection with the accompanying drawings which illustrate a preferred form of the device.

In the drawings:

FIG. 1 is a side elevational view of a cutting torch with the present attachment secured thereon;

FIG. 2 is an enlarged, fragmentary plan view of the attachment removed from the torch, partly broken away and taken on the line 2—2 of FIG. 1;

FIG. 3 is an enlarged, sectional view taken on the line 3—3 of FIG. 1;

FIG. 4 is an enlarged, vertical sectional view taken on the line 4—4 of FIG. 1; and FIG. 5 is an enlarged, fragmentary sectional view taken on the line 5—5 of FIG. 2.

Referring now in particular to the drawings, the numeral 10 designates a cutting torch of conventional construction, having a head 12 and a control valve 14. The head 12 of the torch has a nozzle or tip 16 which in the usual construction has a tapered lower portion 16a and an upper straight or non-tapered portion 16b. The attachment of the present invention is adapted for mounting on the tip 16 and preferably on the non-tapered portion 16b.

With reference to FIGS. 1, 2 and 4, the attachment includes a body member 18 by means of which the attachment is removably secured on the tip 16. Such body member includes a collar 20 having a top right angle flange 22. Secured circumferentially to collar 20 on the lower portion thereof is a ring member 24. This ring member is secured to the collar 20 by set screws 26 which also extend through apertures 28 in the collar and engage the tip of the torch for locking the body member in place. At least three of the set screws 26 are provided around the collar 20, and by suitable adjustment of said set screws the body member may be secured concentrically on the tip.

Rotatably supported on the collar 20 between the flange 22 and the ring member 24 is a carrier or head plate 30 which as best seen in FIG. 2 has oppositely projecting extensions 32. While the plate 30 is rotatably supported on the collar 20, it is adapted to be locked in a non-rotatable or set position by a locking screw 34 threadedly mounted in vertical position on top of the plate 30 and disposed such that the underside of its head is adapted to bear against and have locking engagement with the upper side of flange 22 of collar 20. Thus, by tightening the screw 34 the plate 30 can be locked in any desired rotated position on the collar 20 or if desired the screw 34 can be loosened to allow free rotation of said plate.

Plate 30 has an aperture 36 adjacent each of its outer ends, and these apertures slidably receive posts 38 having wheels 40 mounted on their lower ends. With particular reference to FIG. 2, the wheel supporting posts 38 are engageable by set screws 42 threadedly mounted in the plate 30 whereby such posts may be adjusted in any selected extended position with relation to the plate. Also, as best seen in FIG. 2, the posts 38 are square in cross section, and by this struceure, they may be mounted in the apertures 36 selectively so as to position the axis of the wheels either longitudinally of the torch, as shown in FIG. 1, or laterally of the torch, depending upon what direction the torch is to be moved in supported relation on the wheels.

Projecting from one end extension 32 of the plate 30 is an arm or rod 44, FIGS. 1, 2 and 5. Preferably, this arm has detachable connection to the plate 30, and for this purpose it has an end plate 46 removably secured to the upper surface of the plate 30 by screws 48. The plate 46 has an aperture 50 slidably receiving the wheel supporting post 38 on that side of the carrier plate 30.

Mounted on the arm 44 is a pivot post 52. This post is adapted to have vertical adjustable movement with relation to the arm 44 as well as longitudinal adjustable movement along the arm. For this purpose, a head 54 is employed having an aperture 56, FIG. 2, to receive the arm 44 and an aperture 58 at right angles to the aperture 56 and offset therefrom to receive the pivot post 52. A set screw 60 is threadedly mounted in the head 54 to have engagement with the arm 44 for securing the head in a fixed position on the rod. The head 54 also has a set screw 62 threadedly mounted therein which is adapted to engage the post 52 for holding the latter in selected vertical positions of adjustment.

Associated with the post 52 is a permanent magnet foot or block 64, FIG. 1, for magnetic attachment to a sheet of metal 68 to be cut. Foot 64 has an aperture 66 for receiving the post 52. Post 52 is circular in cross section and aperture 66 likewise is circular and of substantially the same dimension in its diameter as the post in order to provide a stable, rotatable mounting of the post when used as a pivot or compass point. The post 52 is constructed of a non-magnetic material such as stainless steel in order that the magnet will not resist rotation of the post therein.

In the use of the present attachment, it is mounted on the tip 16 of the torch by means of the set screws 26. The internal diameter of the collar 20 is sufficiently large to fit the larger tips and yet it can fit any smaller size tip merely by inward adjustment of the set screws 26, such set screws being of sufficient length to provide the necessary range of engagement for different sized tips.

With the attachment mounted on the torch, the wheel supporting posts 38 and the pivot posts 52 are adjusted on their respective supporting members to provide the support and guiding movement desired. For example, if it is desired to guide the torch in a circular pattern, the the pivot post 52 is selectively adjusted to the proper longitudinal position on the arm 44 and also adjusted vertically on the arm as desired. The point of the post may be sufficient to anchor the torch for rotation but to be sure that the pivot point will not move the magnet 64 is placed on the sheet or plate 68 being cut in the proper position. For supporting the torch for circle cutting, either one or both wheels 40 may be lowered to engage the sheet 68 but preferably in circle cutting only one of such wheels is used at a time. For example, it may be desired to use the wheel nearest the post 52 where the outer wheel may run off the edge of the sheet or when cutting a hole in the sheet the outside wheel may be used, the wheel which is not used being locked in an upper out of the way position. In circle cutting the lock screw 34 is released to allow free rotation of the carrier plate 30 on the body member 18. In straight line cutting, the pivot post 54 is adjusted to an upper out of the way position and one or both of the posts 38 adjusted downwardly to engage the wheels with sheet 68. The wheels in FIG. 1 are positioned for transverse cutting, either in a circular or straight line motion, and if it is desired to move the torch for cutting in a direction longitudinally thereof it is merely necessary to remove the wheel supporting posts 38 and reposition them 90° in the carrier plate 30. In straight line cutting it is usually desired that the carrier plate 30 be locked in a non-rotative position.

It is also possible to guide the torch in an angle cut by selectively positioning the posts 38 at different vertical heights with relation to each other. Some angle cutting can be achieved by the torch when guided in a circular path by the posts 52 but primarily angle cutting is usually accomplished in a straight line. If necessary, the rod 44 may be disconnected from the plate 30 by removing the screws 48.

The present attachment is simplified in construction and economical to manufacture. Furthermore it is easily attached to and detached from the torch and good rolling support is provided by the two support wheels. As stated, the present attachment can be secured to substantially any existing torch, by means of set screws 26, and is readily centered on the tip of the torch by proper setting of set screws 26.

It is to be understood that the form of my invention herein shown and described is to be taken as a preferred example of the same and that various changes in the shape, size and arrangement of parts may be resorted to without departing from the spirit of my invention.

Having thus described my invention, I claim:

1. An attachment for cutting torches and the like having a tip with a bottom nozzle end, comprising
   (a) a collar,
   (b) means arranged to secure said collar on the tip of a torch,
   (c) carrier means rotatably supported on said collar with its axis parallel to the axis of the tip,
   (d) releasable lock means engageable between said collar and carrier means for locking said carrier means in selected rotated positions on said collar, and
   (e) supporting guide means on said carrier means arranged to support and guide the torch in operative functions thereof.

2. The cutting torch attachment of claim 1 wherein said supporting guide means includes
   (a) a pair of post members slidably mounted in said carrier means in a direction substantially parallel to the axis of the tip,
   (b) said post members being disposed on opposite sides of the tip in the secured position of said collar,
   (c) wheel means on the lower end of said post members providing a support for the torch on a supporting surface, and
   (d) a lock means engageable between said carrier means and each of said post members for individually locking the latter in selected extended positions for supporting the tip in vertical or selected tilted disposition.

3. The cutting torch attachment of claim 1 wherein said supporting guide means includes
   (a) a pair of post members slidably mounted in apertures in said carrier means in a direction substantially parallel to the axis of the tip, and
   (b) a wheel means on the lower ends of said post members,
   (c) said post members being rectangular in cross section and said apertures also being rectangular and dimensioned such that said posts are arranged to be held non-rotatably in two positions therein one of which supports the wheels with their axes extending laterally of the attachment and the other of which supports the wheels with their axes extending longitudinally of the attachment.

4. The cutting torch attachment of claim 1 wherein
   (a) said collar has an inner diameter of larger diameter than the outer diameter of the usual cutting torch tip,
   (b) and including set screws extending radially through said collar for engaging said tip and securing said collar thereto.

5. The cutting torch attachment of claim 1 including an arm extension releasably attached to said carrier means.

References Cited

UNITED STATES PATENTS 2,049,575   8/1936   Sutton.

FOREIGN PATENTS 234,168   12/1944   Switzerland.

ROBERT D. BALDWIN, Primary Examiner

U.S. Cl. X.R.

33—27